United States Patent
Ahn et al.

(10) Patent No.: US 12,520,192 B2
(45) Date of Patent: Jan. 6, 2026

(54) METHOD AND APPARATUS FOR SCHEDULING AIR RESOURCE OF VIRTUAL DISTRIBUTED UNIT IN WIRELESS COMMUNICATION SYSTEM

(71) Applicant: SAMSUNG ELECTRONICS CO., LTD., Suwon-si (KR)

(72) Inventors: Heungseop Ahn, Suwon-si (KR); Hanjung Park, Suwon-si (KR); Joonhwan Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 239 days.

(21) Appl. No.: 18/231,592

(22) Filed: Aug. 8, 2023

(65) Prior Publication Data
US 2024/0031864 A1   Jan. 25, 2024

Related U.S. Application Data

(63) Continuation of application No. PCT/KR2023/010600, filed on Jul. 21, 2023.

(30) Foreign Application Priority Data

Jul. 22, 2022 (KR) .................. 10-2022-0091320

(51) Int. Cl.
- *H04W 28/084* (2023.01)
- *H04L 5/00* (2006.01)
- *H04W 28/08* (2023.01)

(52) U.S. Cl.
CPC ......... *H04W 28/084* (2023.05); *H04L 5/0048* (2013.01); *H04W 28/0867* (2020.05)

(58) Field of Classification Search
CPC .............. H04L 5/0048; H04W 28/084; H04W 28/0867
See application file for complete search history.

(56) References Cited

U.S. PATENT DOCUMENTS

| 10,952,265 B2 | 3/2021 | Yang et al. |
| 2020/0305128 A1 | 9/2020 | Abedini et al. |
(Continued)

FOREIGN PATENT DOCUMENTS

| CN | 113992688 A | 1/2022 |
| KR | 10-2017-0088096 A | 8/2017 |
(Continued)

OTHER PUBLICATIONS

International Search Report and Written Opinion issued Oct. 23, 2023 by the International Searching Authority in International Patent Application No. PCT/KR2023/010600. (PCT/ISA/220, PCT/ISA/210 and PCT/ISA/237).
(Continued)

*Primary Examiner* — Khoa Huynh
(74) *Attorney, Agent, or Firm* — Sughrue Mion, PLLC

(57) ABSTRACT

A schedule coordinator schedules an air resource of a virtual distributed unit (vDU) in a wireless communication system. The schedule coordinator identifies a radio unit (RU) to be migrated to a target vDU, from among one or more RUs connected to a source vDU, requests the source vDU to exclusively transmit or receive first information including synchronization information of one or more user equipments (UEs) connected to the RU. The schedule coordinator allocates a source vDU-dedicated air resource to the source vDU, and allocates a target vDU-dedicated air resource to the target vDU. When a migration of the RU is completed, the schedule coordinator requests the target vDU to exclusively transmit or receive the first information, and requests the source vDU to stop transmitting or receiving the first information.

15 Claims, 10 Drawing Sheets

(56) References Cited

U.S. PATENT DOCUMENTS

| | | | |
|---|---|---|---|
| 2021/0303168 A1* | 9/2021 | Potluri | .................. G06F 3/0604 |
| 2022/0070740 A1 | 3/2022 | Futaki et al. | |
| 2022/0086829 A1 | 3/2022 | Akl et al. | |
| 2022/0167418 A1* | 5/2022 | Zelezniak | ............. H04W 80/02 |
| 2022/0217570 A1 | 7/2022 | Akl et al. | |
| 2022/0231927 A1 | 7/2022 | Suthar et al. | |
| 2023/0413111 A1* | 12/2023 | Kotaru | .............. H04W 28/0858 |

FOREIGN PATENT DOCUMENTS

| | | |
|---|---|---|
| KR | 10-2075760 B1 | 3/2020 |
| KR | 10-2021-0086357 A | 7/2021 |
| WO | 2021/260188 A1 | 12/2021 |

OTHER PUBLICATIONS

Jiaxin Feng et al., "Demonstration of Containerized vDU/vCU Migration in WDM Metro Optical Networks," 2020 Optical Fiber Communications Conference and Exhibition (OFC), IEEE, May 5, 2020, Total 5 pages.

* cited by examiner

METHOD AND APPARATUS FOR SCHEDULING AIR RESOURCE OF VIRTUAL DISTRIBUTED UNIT IN WIRELESS COMMUNICATION SYSTEM

CROSS REFERENCE TO RELATED APPLICATIONS

The present application is a continuation of international application PCT/KR2023/010600 filed on Jul. 21, 2023 in the Korean Intellectual Property Office and claims benefit of priority to Korean Patent Application No. 10-2022-0091320 filed on Jul. 22, 2022 in the Korean Intellectual Property Office. The above applications are hereby incorporated by reference.

FIELD

The disclosure relates to a wireless communication system, and more particularly, to a method and apparatus for scheduling an air resource for transmitting or receiving various types of information in a wireless communication system including a virtual distributed unit (vDU).

BACKGROUND

As ideas and technologies such as cloud computing and virtualization develop, architecture in legacy communication network fields is being changed. Closeness is substituted with openness, exclusiveness is substituted with generality, and network functions on a communication network element are extracted and virtualized to be executed on a general hardware platform such as in cloud services.

A virtual radio access network (vRAN) is a scheme by which a communication service provider operates a baseband function via software. Virtualization of a radio access network (RAN) may be achieved by network function virtualization (NFV), and in this case, the RAN may be executed in a standard server without dedicated hardware.

The NFV is a technology by which a network is configured with a general-purpose high-performance server, a storage device, and a switch, without a legacy network being highly dependent on dedicated hardware. Various network functions for providing services are virtualized and flexibly managed.

In the NFV, general-purpose hardware is used to perform various network software functions. Accordingly, flexible configuration of software may be implemented in locations such as a data center, a wide-area network, or the like. Also, complexity of service deployment or total investment costs may be reduced, and normalization and adaptability of network devices may be improved. In a communication network, functions of some standard network elements such as a gateway general packet radio service support node (GGSN), a mobility management entity (MME), or the like may be virtualized and arranged in a general hardware device of a data center.

In the NFV, one or more virtualized network functions (VNFs) for implementing a network service may be defined. With respect to a VNF requested to implement each network service, physical/virtual network resources may be automatically allocated. For example, in the NFV (in particular, an orchestrator of management and orchestration (MANO)), automatic allocation of computing resources may be managed according to various factors such as network service requirements, maximum performance and capacity of a computing resource, computing resource management policy of a network service provider, or real-time situation changes in network services and computing resources.

A general 5G wireless access network is configured as a topology in which a centralized unit (CU), a distributed unit (DU), and a radio unit (RU) are 1:N:M (1<N<M), and each DU may have a computing resource enough to process maximum traffic that is loadable to RUs connected to each DU. Average traffic loaded to an RU may be about 20% of its maximum amount, and thus, it may be determined that a resource more than necessary is allocated to a CU. In a vRAN system where a CU and a DU are implemented via software in a general-purpose server, such static server resource allocation may cause a problem in that a computing resource is wasted or power consumption of an entire system increases.

Accordingly, there is a demand for a technology for efficiently using a server resource by dynamically scaling-in or scaling-out a DU according to real-time traffic situation in the vRAN system.

SUMMARY

An embodiment of the disclosure may provide a technology by which, when a virtual distributed unit (vDU) scaling operation is performed in a virtual radio access network (vRAN) system, an amount of air resources allocated to each vDU is adjusted according to the number of user equipments (UEs) connected to each vDU, such that a server resource may be efficiently used and entire power consumption of a system may be reduced.

An embodiment of the disclosure provides a technology by which, while a specific resource unit (RU) is migrated from a source vDU to a target vDU, synchronization information of a UE connected to the RU is exclusively transmitted or received by the source vDU, such that a vDU may be scaled without disconnecting communication of UEs connected to the RU.

An embodiment of the disclosure provides a technology by which a schedule coordinator controls a medium access control (MAC) scheduler included in a source vDU and a MAC scheduler included in a target vDU while a vDU scheduling operation is performed, such that there is no need to transmit or receive a resource map between the source vDU and the target vDU, signaling overhead does not occur, and concurrency to perform resource scheduling in respective vDUs is ensured.

The technical problems of an embodiment of the disclosure are not limited to the aforementioned technical features, and other unstated technical problems may be inferred from embodiments below As a technical means to resolve the technical problems addressed above, a method, performed by a schedule coordinator, of scheduling an air resource of a virtual distributed unit (vDU) in a wireless communication system may include identifying a radio unit (RU) to be migrated to a target vDU, from among one or more RUs connected to a source vDU, requesting the source vDU to exclusively transmit or receive first information including synchronization information of one or more user equipments (UEs) connected to the RU, allocating a source vDU-dedicated air resource to the source vDU, and allocating a target vDU-dedicated air resource to the target vDU, and when migration of the RU is completed, requesting the target vDU to exclusively transmit or receive the first information, and requesting the source vDU to stop transmitting or receiving the first information.

As a technical means to resolve the technical problems addressed above, an apparatus for scheduling an air resource of a vDU in a wireless communication system may include a transceiver, and at least one processor. The at least one processor may be configured to identify a RU to be migrated to a target vDU, from among one or more RUs connected to a source vDU, request, via the transceiver, the source vDU to exclusively transmit or receive first information including synchronization information of one or more UEs connected to the RU, allocate a source vDU-dedicated air resource to the source vDU, and allocate a target vDU-dedicated air resource to the target vDU, and when migration of the RU is completed, request, via the transceiver, the target vDU to exclusively transmit or receive the first information, and request, via the transceiver, the source vDU to stop transmitting or receiving the first information.

As a technical means to resolve the technical problems addressed above, a vRAN connected to a core network in a wireless communication system may include a virtual centralized unit (vCU), at least one vDU connected to the vCU, at least one RU connected to the at least one vDU, and a schedule coordinator configured to schedule an air resource of the at least one vDU. The schedule coordinator may be further configured to identify a RU to be migrated to a target vDU, from among one or more RUs connected to a source vDU, request the source vDU to exclusively transmit or receive first information including synchronization information of one or more UEs connected to the RU, allocate a source vDU-dedicated air resource to the source vDU, and allocate a target vDU-dedicated air resource to the target vDU, and when migration of the RU is completed, request the target vDU to exclusively transmit or receive the first information, and request the source vDU to stop transmitting or receiving the first information.

As a technical means to resolve the technical problems addressed above, a computer-readable recording medium may have stored therein a program for executing, on a computer, at least one of disclosed embodiments of the method.

DETAILED DESCRIPTION

Figure 1:
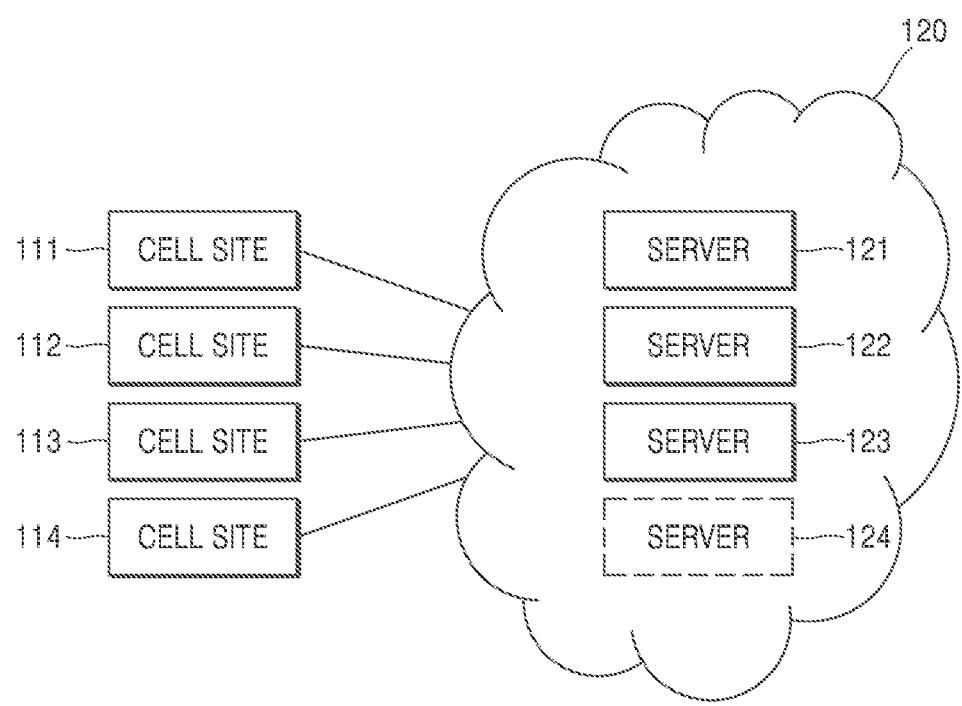
FIG. 1 illustrates a virtual distributed unit (vDU), according to an embodiment of the disclosure.

Throughout the disclosure, the expression "at least one of a, b or c" indicates only a, only b, only c, both a and b, both a and c, both b and c, all of a, b, and c, or variations thereof.

In the descriptions of the disclosure, certain detailed explanations of the related art which are well known in the art to which the disclosure belongs and are not directly related to the disclosure are omitted. By omitting unnecessary explanations, the essence of the disclosure may not be obscured and may be explicitly conveyed. The terms used in the specification are defined in consideration of functions used in the disclosure, and may be changed according to the intent or known methods of operators and users. Accordingly, definitions of the terms should be understood based on the entire description of the present specification.

For the same reason, some elements in the drawings are exaggerated, omitted, or schematically illustrated. Also, the size of each element does not entirely reflect the actual size. In the drawings, the same or corresponding elements are denoted by the same reference numerals.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein. Rather, these embodiments are provided so that the disclosure will be thorough and complete and will fully convey the concept of the disclosure to one of ordinary skill in the art. An embodiment of the disclosure will only be defined by the appended claims. Throughout the specification, like reference numerals denote like elements. In the descriptions of an embodiment of the disclosure, detailed explanations of the related art are omitted when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire descriptions of the present specification.

Considering the development of wireless communication from generation to generation, the technologies have been developed mainly for services targeting humans, such as voice calls, multimedia services, data services, and the like. Following the commercialization of $5^{th}$ generation (5G) communication systems, it is expected that connected devices being exponentially growing will be connected to communication networks. Examples of things connected to networks may include vehicles, robots, drones, home appliances, displays, smart sensors connected to various infrastructures, construction machines, factory equipment, and the like. Mobile devices are expected to evolve in various form-factors such as augmented reality glasses, virtual reality headsets, hologram devices, and the like. In order to provide various services by connecting hundreds of billions of devices and things in the $6^{th}$ generation (6G) era, there have been ongoing efforts to develop enhanced 6G communication systems. For these reasons, 6G communication systems are referred to as beyond-5G systems.

6G communication systems will have a peak data rate of tera (i.e., 1,000 giga)-level bps and a radio latency less than 100 psec. That is, the 6G communication systems will be 50 times as fast as 5G communication systems and have one tenth the radio latency of 5G.

In order to achieve such a high data rate and an ultra-low latency, it has been considered to implement the 6G communication systems in a terahertz band (for example, 95 GHz to 3 THz bands). It is expected that, due to severer path loss and atmospheric absorption in the terahertz bands than those in millimeter wave (mmWave) bands introduced in 5G, technologies capable of securing the signal transmission distance, that is, coverage, will become more important. It is necessary to develop, as major technologies for securing the coverage, radio frequency (RF) elements, antennas, novel waveforms having better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, in order to improve the coverage of terahertz-band signals, there has been ongoing discussion on new technologies such as metamaterial-based lenses and antennas, a high-dimensional spatial multiplexing technology using orbital angular momentum (OAM), reconfigurable intelligent surface (RIS), and the like.

Moreover, in order to improve the spectral efficiency and the overall network performances, the following technologies have been developed for 6G communication systems, which include a full-duplex technology for enabling an uplink transmission and a downlink transmission to simultaneously use the same frequency resource at the same time, a network technology for using satellites, high-altitude platform stations (HAPS), and the like in an integrated manner, an improved network structure for supporting mobile base stations and the like and enabling network operation optimization and automation and the like, a dynamic spectrum sharing technology via collision avoidance based on a prediction of spectrum usage, an use of artificial intelligence (AI) in wireless communication for improvement of overall network operation by using AI in a designing phase for developing 6G and internalizing end-to-end AI support functions, and a next-generation distributed computing technology for overcoming the limit of UE computing ability through reachable super-high-performance communication and computing resources (such as mobile edge computing (MEC), clouds, and the like) over the network. In addition, through designing new protocols to be used in the 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of the 6G communication systems in hyper-connectivity, including person to machine (P2M) as well as machine to machine (M2M), will allow the next hyper-connected experience. In more detail, it is expected that services such as truly immersive extended reality (XR), high-fidelity mobile hologram, and digital replica can be provided through the 6G communication systems. In addition, services such as remote surgery for security and reliability enhancement, industrial automation, and emergency response will be provided through the 6G communication system, such that the technologies can be applied in various fields such as industry, medical care, automobiles, home appliances, and the like.

Hereinafter, a base station (BS) is an entity that allocates resources to a UE, and may be at least one of a gNode B, an eNode B, a Node B, (or xNode B (where, x indicates an alphabet letter including g or e), a radio access unit, a BS controller, a satellite, an airborne entity, or a node on a network. A user equipment (UE) may include a mobile station (MS), a vehicle, a satellite, an airborne entity, a cellular phone, a smartphone, a computer, or a multimedia system enabled to perform a communication function. In the disclosure, a downlink (DL) is a wireless transmission path of a signal transmitted from a BS to a UE, and an uplink (UL) is a wireless transmission path of a signal transmitted from a UE to a BS. In addition, there may be a sidelink (SL) indicating a wireless transmission path of a signal being transmitted from a UE to another UE.

Although long term evolution (LTE), LTE-Advanced (LTE-A), or $5^{th}$ generation (5G) system is mentioned as an example in the following description, embodiments of the disclosure may also be applied to other communication systems having similar technical backgrounds or channel types. For example, 5G-Advance or New Radio (NR)-Advance or $6^{th}$ generation (6G) mobile communication technology, which is developed after a 5G mobile communication technology (or NR), may be included therein, and hereinafter, 5G may refer to a concept including legacy LTE, LTE-A, and other similar communication services. An embodiment of the disclosure is applicable to other communication systems through modification at the discretion of one of ordinary skill in the art without greatly departing from the scope of the disclosure.

In an embodiment of the disclosure, it will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus.

In addition, each block of the flowchart illustrations may represent a module, segment, or portion of code, which includes one or more executable instructions for performing specified logical function(s). In an embodiment of the disclosure, it should also be noted that the functions noted in the blocks may occur out of the order. For example, two blocks shown in succession may in fact be executed substantially concurrently or the blocks may sometimes be executed in the reverse order, depending upon the functionality involved.

The term " . . . unit" as used in an embodiment of the disclosure refers to a software or hardware element, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. In an embodiment of the disclosure, a " . . . unit" may include, by way of example, elements, such as software elements, object-oriented software elements, class elements, and task elements, processes, functions, attributes, procedures, subroutines, segments of program code, drivers, firmware, microcode, circuitry, data, databases, data structures, tables, arrays, and variables. The functionality provided in the elements and " . . . units" may be combined into fewer elements and " . . . units" or further separated into additional elements and " . . . units". In addition, in an embodiment of the disclosure, a " . . . unit" may include one or more processors.

Hereinafter, terms indicating broadcasting information, terms indicating control information, terms related to communication coverage, terms indicating a state change (e.g., event), terms indicating network entities, terms indicating messages, terms indicating elements of an apparatus, or the like, as used in the following description, are exemplified for convenience of descriptions. Accordingly, the disclosure is not limited to terms to be described below, and other terms indicating objects having equal technical meanings may be used.

Hereinafter, for convenience of description, terms and names defined in the most recent LTE and new radio (NR) standards from among current communication standards, the LTE and NR standards being defined by the $3^{rd}$ Generation Partnership Project Long Term Evolution (3GPP LTE) group, may be used. However, the disclosure is not limited to these terms and names, and may be equally applied to communication systems conforming to other standards.

Hereinafter, embodiments of the disclosure will now be described more fully with reference to the accompanying drawings.

FIG. 1 illustrates a virtual distributed unit (vDU) 120, according to an embodiment of the disclosure.

The demand for traffic in a mobile communication market increases due to the popularity of high-resolution video streaming, augmented reality (AR) and virtual reality (VR) services, or the like. Performance of a radio access network (RAN) that is an important configuration of a mobile network may have a direct impact on a service quality experience of a user. RAN architecture used to be applied to a communication system before 5G has closed system architecture and thus, is not efficient to satisfy quality requirements of the 5G service. A virtual radio access network (vRAN) facilitates flexible and efficient network operation, compared to a not-virtual RAN. The vRAN architecture may include a virtual distributed unit (vDU) to perform baseband processing. A vRAN according to an embodiment of the disclosure will be described in detail with reference to FIG. 3 below.

In the 5G network, RAN system architecture with flexible function segmentation may be applied. In a 5G RAN, an integrated network system may be segmented into a plurality of functional elements and the functional elements may be separately re-distributed when necessary. For example, the 5G RAN may include a centralized unit (CU) and at least one distributed unit (DU). In the CU, a network function of a radio resource control (RRC) or packet data convergence protocol (PDCP) entity may be performed in a non-realtime manner. In the DU, baseband processing functions of radio link control (RLC), medium access control (MAC), or physical (PHY) entity may be performed in a realtime manner. In an embodiment of the disclosure, the PHY entity of the DU may be further segmented between the DU and a radio unit (RU). The partition of the CU and the DU may indicate upper layer partition, and the partition of the DU and the RU may indicate lower layer partition.

In an embodiment of the disclosure, the CU may be connected to a plurality of DUs. In this case, RRC/PDCP functions may be centralized, and a quality of service (QoS) associated with a handover in the same CU may be improved. Also, the centralized CU may perform pooling on a resource with respect to the plurality of DUs, such that resource efficiency may be increased.

The 5G RAN including the CU and the DU may efficiently support dual connectivity (DC). In a network where the CU and the DU are separate, a PDCP is offloaded to the CU such that it is possible to prevent a PDCP load from being centered on an anchor DU and prevent a load imbalance between DUs.

Virtualization allows an increase in adaptability and flexibility by transitioning a network entity from dedicated hardware to a software element. For example, the CU may be virtualized to configure a virtual centralized unit (vCU), and the DU may be virtualized to configure a vDU. A virtualized network function may be operated on a common platform, instead of dedicated hardware, and may be implemented by using a software-based cloud technology. A network may satisfy advanced service requirement via the virtualization. For example, by using the vDU, all baseband functions of an RLC layer, a MAC layer, or a PHY layer may be executed via an existing server.

In the vRAN, a network function may be completely separated from hardware. For example, at least one RAN function may be operated in single hardware, such that flexibility of a network may be improved. For an existing hardware-oriented network solution, hardware has to be replaced to distribute a new function or service. In the vRAN, hardware and software are separate, such that infrastructure may be independently and horizontally extended, and a new function or service may be flexibly added by upgrading software without changing hardware. In an embodiment of the disclosure, a vRAN system may indicate a RAN system in which capital expenditures (CAPEX) and operating expenses (OPEX) are reduced by virtualizing a DU and a CU.

In the vRAN including the vDU, a resource may be dynamically allocated according to various demands, instead of allocation of a fixed resource. For example, the vRAN may flexibly manage a vDU resource by performing dynamic scheduling, and may efficiently deal with a network state change by performing pooling. The network state change may include a case where resource adjustment is requested, such as traffic change according to environment information, cell site addition, unexpected traffic change due to an event, traffic load imbalance between cell sites connected to the vDU, and the like.

Referring to FIG. 1, efficiency in resource management may be improved via vDU pooling. A pooling technology may indicate a technology by which a plurality of cell sites 111, 112, 113, and 114 share a resource pool 120. Via the vDU pooling, 1:1 relation between a DU and a cell site is cut, and the DU is pooled and thus is virtualized, such that the number of servers required to build a RAN system may be decreased (CAPEX decrease). The resource pool 120 may be implemented in a plurality of vDU servers 121, 122, and 123 (hereinafter, also referred to as the servers 121, 122, and 123 or the server resources 121, 122, and 123). According to the vDU pooling technology, a single vDU shares a baseband processing resource and may support baseband processing with respect to the plurality of cell sites 111, 112, 113, and 114.

In a not-virtualized RAN system, a DU and a cell may be connected in a 1:1 manner, and a processing capacity of a specific DU may be determined in proportion to maximum traffic available for the cell site corresponding thereto. Traffic that is coming via a specific cell site may change, and a time period in which maximum traffic actually occurs is limited. Therefore, at least a portion of a DU resource is not used, except for the time period in which the maximum traffic actually occurs. That is, when one DU corresponds to one cell site, for example, when one server 121 corresponds to one cell site 111, an available resource (an idle resource) may remain in each of DUs. However, an idle resource other than a resource requested to support the cell site 111 cannot be used to support other cell sites 112, 113, and 114. Therefore, it is inefficient as an amount of idle server resources corresponding to the number of cell sites is not used.

When the plurality of cell sites 111, 112, 113, and 114 are connected to one resource pool 120 via the vDU pooling, all server resources in the resource pool 120 may be used to support the plurality of connected cell sites 111, 112, 113, and 114. Therefore, an idle amount of the first server resource 121 which remains after the support of the first cell site 111 may be used to support the second cell site 112. That is, a resource may be efficiently used, compared to a case where one DU supports one cell site, and the number of servers constituting the resource pool 120 may be decreased. Referring to FIG. 1, traffic coming from the four cell sites 111, 112, 113, and 114 may be processed by using only three servers 121, 122, and 123. When three physical servers are used, power consumption may also be decreased (OPEX decrease), compared to a case of using four physical servers.

In an embodiment of the disclosure, when total traffic on a network increases and it is not possible to process the traffic by only the allocated server resources 121, 122, and 123, scale-out may be performed. The scale-out indicates an operation in which an additional server resource 124 is allocated (added or arranged) in the resource pool 120 so as to deal with increasing traffic. That is, the scale-out operation may indicate an operation of improving, when capacity or performance of existing servers has reached their limit, performance of an entire network by offloading loads of the existing servers by adding an additional server (e.g., a server with similar specification).

In an embodiment of the disclosure, in a case where four servers 121, 122, 123, and 124 are allocated in the resource pool 120, and total traffic on a network decreases and thus processing is possible by only the three server resources 121, 122, and 123, scale-in may be performed. The scale-in may indicate an operation of saving a network resource by decreasing (removing or deleting) the number of unnecessary servers in the resource pool 120 so as to deal with the decreasing traffic.

As such, according to an embodiment of the disclosure, the vRAN system may dynamically scale-in or scale-out a vDU, depending on a real-time traffic situation, thereby efficiently using the server resources 121, 122, 123, and 124.

Figure 2:
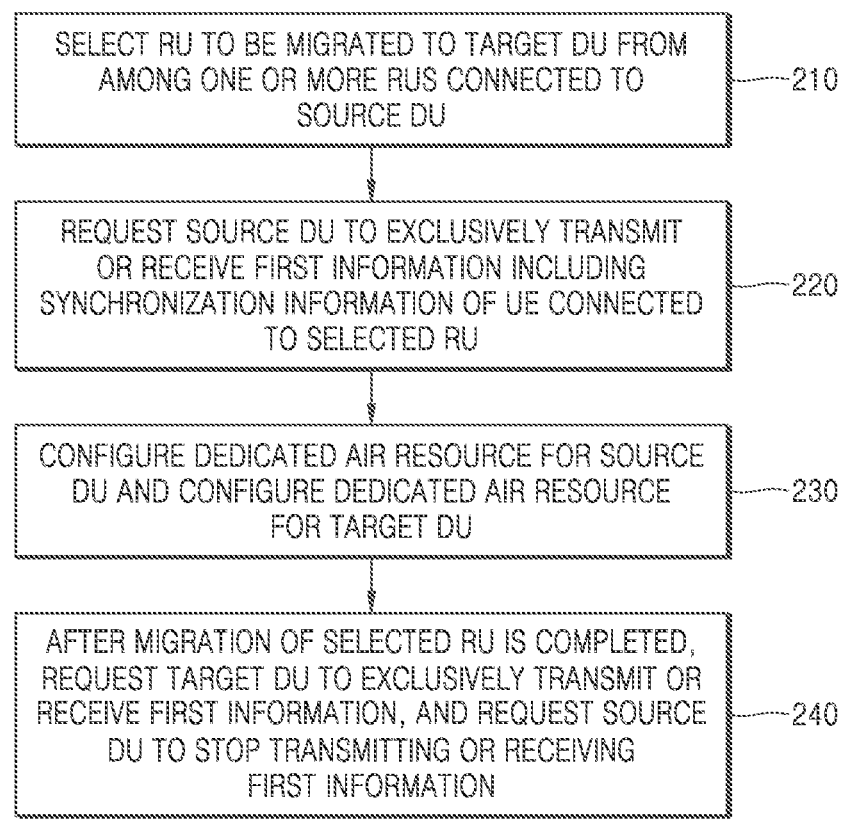
FIG. 2 illustrates a flowchart of a method by which an apparatus such as a schedule coordinator schedules an air resource of a vDU in a wireless communication system, according to an embodiment of the disclosure.

FIG. 2 illustrates a flowchart of a method by which an apparatus such as a schedule coordinator schedules an air resource of a vDU in a wireless communication system, according to an embodiment of the disclosure.

In an embodiment of the disclosure, the method of scheduling an air resource of a vDU in a wireless communication system may be performed by an entity included in a vRAN and connected to the vDU. The apparatus for scheduling an air resource of a vDU may include a network entity such as the schedule coordinator or the like.

The vRAN may include the schedule coordinator, a CU, and at least one DU. The CU included in the vRAN may be a virtualized CU (vCU), and the at least one DU included in the vRAN may each be a virtualized DU (vDU). That is, throughout the disclosure, it may be understood that a CU indicates a vCU, and a DU indicates a vDU.

In operation 210, the apparatus such as the schedule coordinator that schedules an air resource of the vDU selects a RU to be migrated to a target DU from among one or more RUs connected to a source DU. For example, the apparatus may identify a first RU to be migrated to a target vDU, from among one or more RUs connected to the source DU.

In operation 220, the apparatus such as the schedule coordinator that schedules an air resource of the vDU requests the source DU to exclusively transmit or receive first information including synchronization information of a UE connected to the selected RU. For example, the apparatus may request the source vDU to exclusively transmit or receive the first information including synchronization information of UEs connected to a specific RU to be migrated.

In an embodiment of the disclosure, the first information may include at least one of synchronization signal block (SSB) information, common physical downlink control channel (PDCCH) information, channel state information reference signal (CSI-RS) information, or DL common data information.

In order to provide a user with a good communication service, there is a need to not to disconnect network communication of the UEs connected to the specific RU while the specific RU is being migrated from the source vDU to a target vDU. Accordingly, according to an embodiment of the disclosure, while the specific RU is being migrated from the source vDU to the target vDU, the source vDU exclusively transmits or receives synchronization information of a UE connected to the specific RU, such that it is possible to perform vDU scaling while communication of the UEs connected to the specific RU is maintained without disconnection. The activity is exclusive as the source vDU maintains transmission and reception of the synchronization information of the UE and the target vDU does not simultaneously with the source vDU perform transmission and reception of the synchronization information of the UE. That is, the first information to be exclusively transmitted or received by the source vDU during RU migration may correspond to necessary information for network connectivity of the UE.

In operation 230, the apparatus such as the schedule coordinator that schedules an air resource of the vDU may configure a dedicated air resource for the source DU and may configure a dedicated air resource for the target DU. For example, the apparatus may allocate a source vDU-dedicated air resource to the source vDU, and may allocate a target vDU-dedicated air resource to the target vDU.

In an embodiment of the disclosure, second information transmitted on the source vDU-dedicated air resource and the target vDU-dedicated air resource may include at least one of physical downlink shared channel (PDSCH) information, physical uplink shared channel (PUSCH) information, physical uplink control channel (PUCCH) information, sounding reference signal (SRS) information, or UE-specific physical downlink control channel (PDCCH) information.

Table 1 below illustrates physical layer channel and signals in the 5G network.

TABLE 1

| Direction | Data Type | Corresponding PHY Ch. or Signal | Contents | Common/ Dedicated Info. to UE | Scheduling location for time-freq grid | Processing during migration? Source vDU | Processing during migration? Target vDU |
|---|---|---|---|---|---|---|---|
| DL | SS Block (SSB) | PSS SSS DMRS PBCH | — — — MIB | common | fixed | ○ | X |
|  | CSI-RS | CSI-RS | — | common | fixed | ○ | X |
|  | DL Control (common) | DMRS PDCCH | — DCI (for SIB decoding) | common | fixed | ○ | X |
|  | DL Control (dedicated) | DMRS PDCCH | — DCI | dedicated | fixed for CORESET variable for search space in CORESET (search space ⊂ CORESET) | ○ | ○ |
|  | DL Data (common) | DMRS PTRS PDSCH | — — SIB | common | variable (no constraint for time-freq. location) | ○ | X |
|  | DL Data (dedicated) | DMRS PTRS PDSCH | — — DL user data (via DRB) RRC & NAS Signaling (via SRB) | dedicated | variable (no constraint for time-freq. location) | ○ | ○ |
| UL | UL Control | DMRS PTRS PUCCH | — — UCI | dedicated | variable (few constraint for time-freq. location) –> PUCCH Resource(there is a need for configuration for exclusive usage of resource between source vDU and target vDU) | ○ | ○ |
|  | UL Data | DMRS PUSCH | — UL user data (via DRB) RRC & NAS Signaling (via SRB) | dedicated | variable (no constraint for time-freq. location) | ○ | ○ |
|  | UL Sync | PRACH | preamble | dedicated | fixed | ○ | X |
|  | SRS | SRS | — | dedicated | variable (few constraint for time-freq. location) –> SRS Resource(there is a need for configuration for exclusive usage of resource between source vDU and target vDU) | ○ | ○ |

Referring to Table 1, SSB data, CSI-RS data, common DL control data (common PDCCH), common DL data information (common DL data/common PDSCH), UL synchronization information (UL sync data/physical random access channel (PRACH)) signals which are processed only by the source vDU during RU migration indicate necessary information to maintain network connectivity of a UE. The necessary information to maintain network connectivity of the UE may correspond to the first information, and the source vDU may exclusively transmit or receive the first information during RU migration.

Referring to Table 1, other channel or signals among which are not exclusively transmitted or received by the source vDU during RU migration may correspond to the second information. A vDU to transmit or receive data of the second information may vary depending on whether a UE is connected to a source vDU or a target vDU.

A migration from a source vDU to a target vDU proceeds as follows: the target vDU supports user plane traffic to a UE and the source vDU stops supporting user plane traffic to the UE. During this time, the source vDU continues to receive and transmit synchronization messages from and to the UE. The UE is unaware that a migration is in progress. The SC then requests or commands the target vDU to commence supporting the synchronization messages with the UE and the source vDU to stop supporting synchronization messages with the UE. As an example, see operations 730 and 740 of FIG. 7.

In an embodiment of the disclosure, migration of a RU may be performed via a handover of at least one UE connected to the RU. For example, that a specific RU is migrated from a source vDU to a target vDU may indicate that each of UEs connected to the specific RU is connected to the source vDU and then is handed over to the target vDU. That is, at a particular time point during RU migration, some of a plurality of UEs connected to a RU corresponding thereto are completed with respect to their handover to the target vDU, and others are not handed over yet and thus their connection to the source vDU is maintained. In this case, the UEs of which handover to the target vDU is completed may transmit or receive the second information to or from the target vDU by using a target vDU-dedicated air resource, and the UEs of which connection to the source vDU is maintained as the UEs are not handed over yet may transmit or receive the second information to or from the source vDU by using a source vDU-dedicated air resource.

In an embodiment of the disclosure, migration of a specific RU may be completed when one or more UEs connected to the specific RU are all handed over from the source vDU to the target vDU.

In an embodiment of the disclosure, the apparatus such as the schedule coordinator that schedules an air resource of the vDU may receive a migration complete response message from a migration-target RU via a target vDU. In this case, based on the migration complete response message, the apparatus may determine that migration of the migration-target RU from a source vDU to the target vDU is completed.

In an embodiment of the disclosure, an operation, performed by the apparatus, of requesting a source vDU for full transmission or reception of first information may include an operation of allocating a first air resource for transmission or reception of first information to the source vDU. Also, an operation, performed by the apparatus, of allocating a source vDU-dedicated air resource to the source vDU and allocating a target vDU-dedicated air resource to the target vDU may include an operation of segmenting resources, except for the first air resource, in an entire resource pool into the source vDU-dedicated air resource or the target vDU-dedicated air resource.

For example, the operation of segmenting the resources, except for the first air resource, in the entire resource pool into the source vDU-dedicated air resource or the target vDU-dedicated air resource may be based on at least one of the number of UEs connected to the source vDU, the number of UEs connected to the target vDU, an amount of traffic corresponding to the source vDU, or an amount of traffic corresponding to the target vDU. In an embodiment of the disclosure, a region corresponding to the source vDU-dedicated air resource and a region corresponding to the target vDU-dedicated air resource may be separated in at least one of a time band or a frequency band on a resource block (RB) map corresponding to the entire resource pool.

The RB map, the source vDU-dedicated air resource, and the target vDU-dedicated air resource, according to an embodiment of the disclosure, will be described in detail below with reference to FIGS. 8 and 9.

In a DL scenario according to an embodiment of the disclosure, the operation of allocating the source vDU-dedicated air resource to the source vDU and allocating the target vDU-dedicated air resource to the target vDU may include an operation of allocating, to each of the source vDU and the target vDU, a data channel resource for transmitting PDSCH information, and an operation of allocating, to each of the source vDU and the target vDU, an air resource for transmitting UE-specific PDCCH information.

In a UL scenario according to an embodiment of the disclosure, the operation of allocating the source vDU-dedicated air resource to the source vDU and allocating the target vDU-dedicated air resource to the target vDU may include an operation of allocating, to each of the source vDU and the target vDU, a data channel resource for transmitting PUSCH information, and an operation of allocating, to each of the source vDU and the target vDU, an air resource for transmitting PUCCH information or SRS information.

In operation 240, after migration of the selected RU is completed, the apparatus such as the schedule coordinator that schedules an air resource of the vDU may request the target DU to exclusively transmit or receive the first information, and may request the source DU to stop transmitting or receiving the first information. For example, when migration of the specific RU that is a migration target to the target vDU is completed, the apparatus may request the target vDU to exclusively transmit or receive the first information and may request the source vDU to stop transmitting or receiving the first information.

In an embodiment of the disclosure, operations 210 to 240 of FIG. 2 may be repeatedly performed. For example, when a plurality of RUs are to be migrated from the source vDU to the target vDU, the apparatus may select a first RU to be migrated to the target vDU, from among one or more RUs connected to the source vDU, may return to operation 210 after migration of the first RU is completed and then may select a second RU to be migrated to the target vDU, from among one or more RUs connected to the source vDU.

In an embodiment of the disclosure, when a plurality of RUs are to be migrated from the source vDU to the target vDU, even after migration of the first RU is completed, in operation 240, 'an operation of requesting the target vDU to exclusively transmit or receive the first information and requesting the source vDU to stop transmitting or receiving the first information' may not be performed. For example, in order to simplify a procedure and to prevent an unnecessary procedure delay, operation 240 may be performed after migration of all RUs that are to be migrated from the source vDU to the target vDU is completed.

Figure 3:
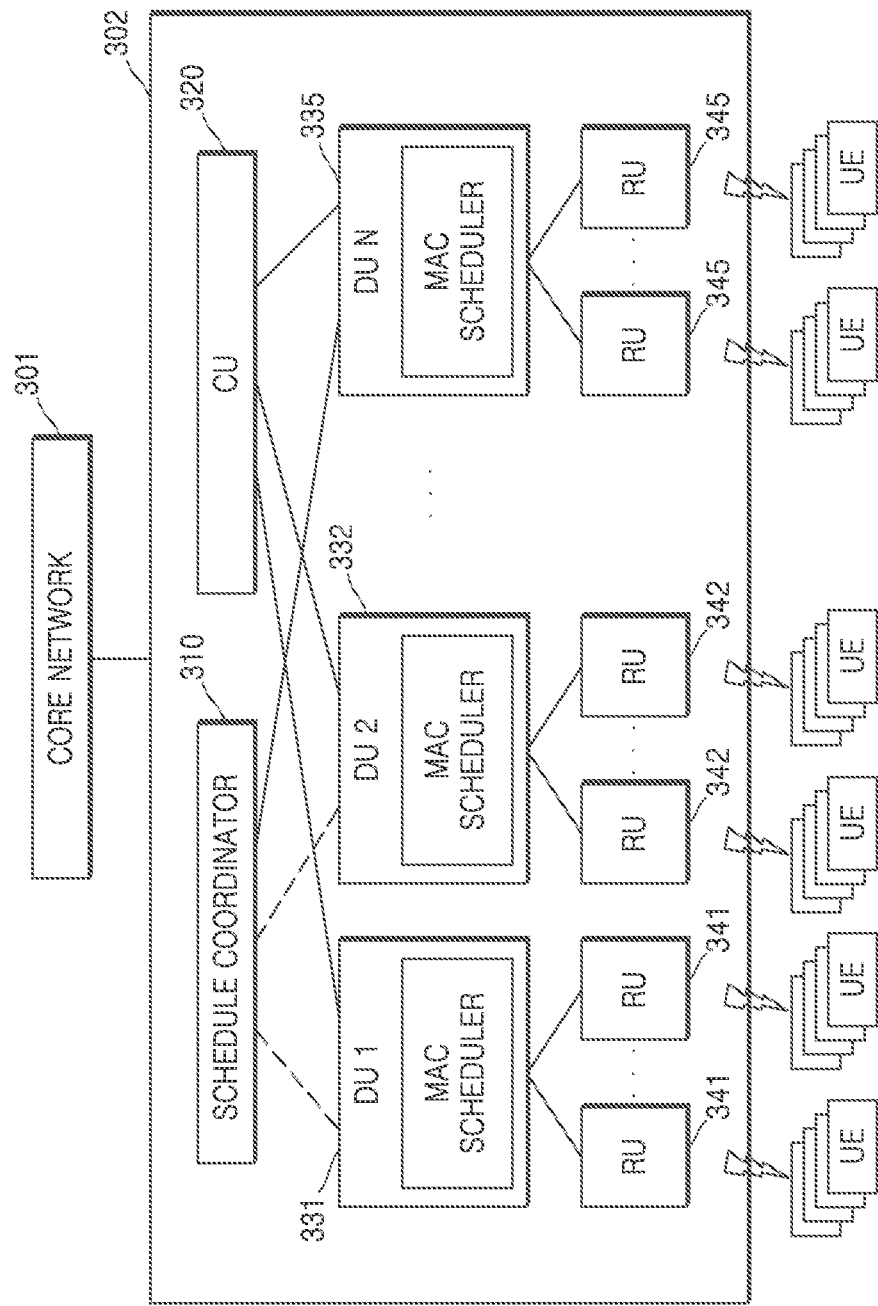
FIG. 3 illustrates a virtual radio access network (vRAN), according to an embodiment of the disclosure.

FIG. 3 illustrates a virtual radio access network (vRAN) 302, according to an embodiment of the disclosure.

The vRAN 302 is a scheme by which a communication service provider operates a baseband function via software. Virtualization of an RAN may be achieved by network function virtualization (NFV), and in this case, the RAN may be executed in a standard server without particular dedicated-hardware.

In an embodiment of the disclosure, the vRAN 302 may be connected to a core network 301. Referring to FIG. 3, the vRAN 302 may include a virtual centralized unit (vCU) 320, one or more vDUs 331, 332, and 335 connected to the vCU 320, one or more RUs 341, 342, and 345 connected to the one or more vDUs 331, 332, and 335, and a schedule coordinator 310 for scheduling air resources of the one or more vDUs 331, 332, and 335.

The schedule coordinator 310 may perform the method of FIG. 2. For example, the schedule coordinator 310 may identify a RU to be migrated to a target vDU, from among one or more RUs connected to a source vDU, may request the source vDU to exclusively transmit or receive first information including synchronization information of at least one UE connected to the RU, may allocate a target vDU-dedicated air resource to the target vDU, may request the target vDU to exclusively transmit or receive the first information when migration of the RU is completed, and may request the source vDU to stop transmitting or receiving the first information.

Referring to FIG. 3, the vRAN 302 may include the schedule coordinator 310, the CU 320, and the one or more DUs 331, 332, and 335. The CU 320 included in the vRAN 302 may be a virtualized CU (vCU), and the one or more DUs 331, 332, and 335 included in the vRAN 302 may each be a virtualized DU (vDU).

The vRAN 302 may be configured as topology in which a ratio of RU, DU, and CU is M:N:1 (M>>N>>1). For example, the vRAN 302 may include one CU 320, and the plurality of DUs 331, 332, and 335 may be connected to the CU 320. Also, the plurality of DUs 331, 332, and 335 may be respectively connected to the plurality of RUs 341, 342, and 345. The RUs 341, 342, and 345 of FIG. 3 may correspond to the cell sites 111, 112, 113, and 114 of FIG. 1, and the DUs 331, 332, and 335 may correspond to the servers 121, 122, and 123 of FIG. 1. UEs may be respectively connected to the plurality of RUs 341, 342, and 345.

In an embodiment of the disclosure, the vRAN 302 may dynamically scale-in or scale-out a DU, depending on a real-time traffic situation. In order to scale-in the DU, the number of DUs included in the vRAN 302 may be decreased. For example, RUs 341 connected to a DU 1 331 may be all migrated to another DU (DU 2 332 or DU N 335), and then DU 1 331 may be removed from the vRAN 302. In order to scale-out the DU, the number of DUs included in the vRAN 302 may be increased. For example, after new DU N+1 is added, at least some of RUs connected to an existing DU (DU 1 331, DU 2 332, or DU N 335) may be migrated to added DU N+1. An operation of scaling-out a DU will be described in detail below with reference to FIGS. 4 to 7.

Figure 4:
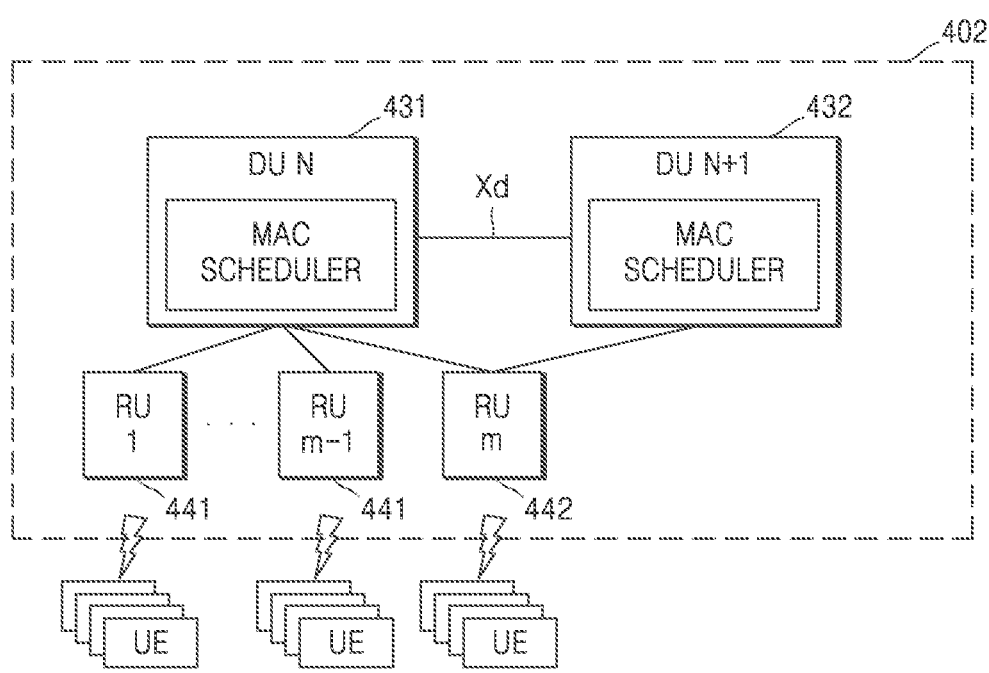
FIG. 4 illustrates an operation of scaling-out a vDU, according to an embodiment of the disclosure.
Figure 5:
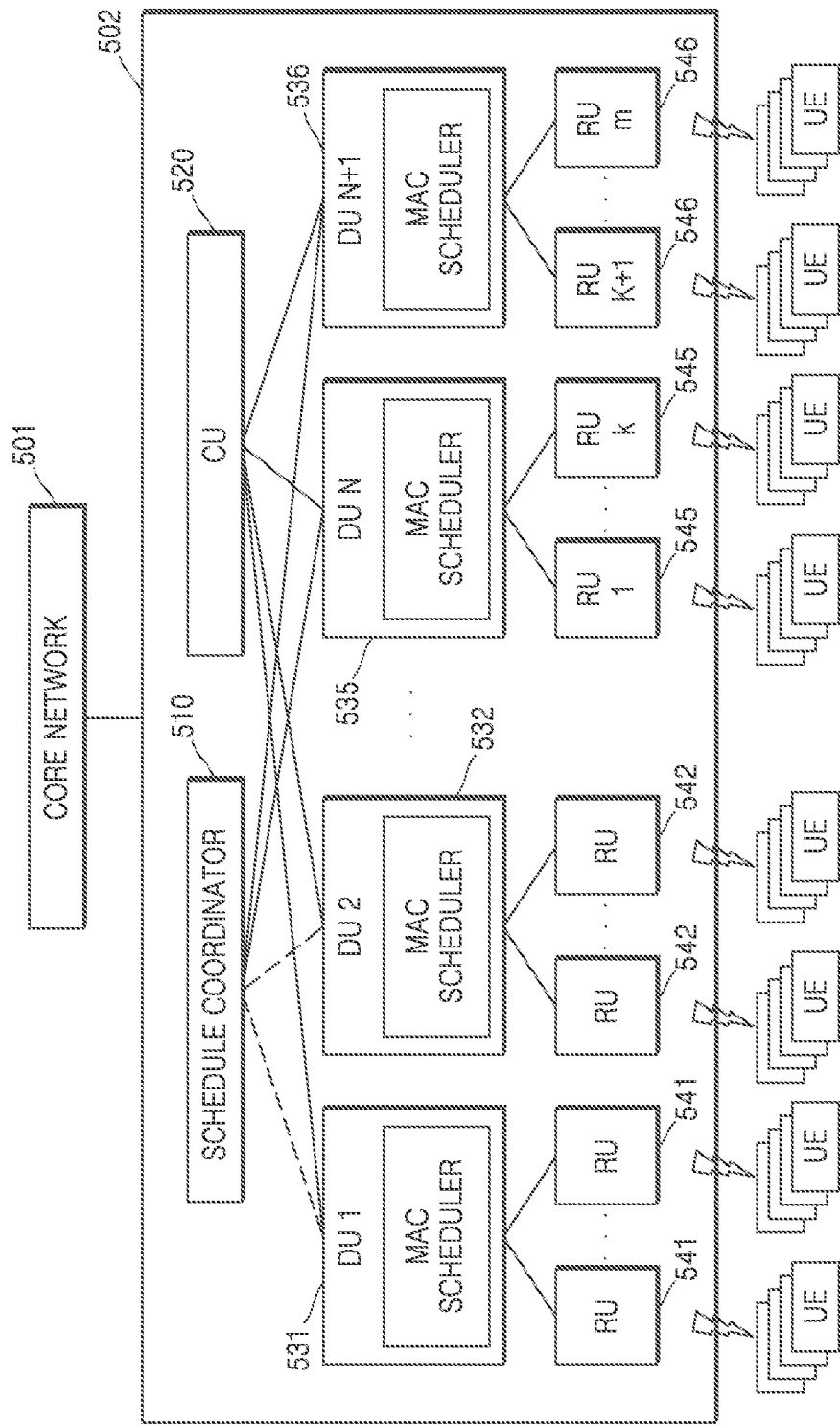
FIG. 5 illustrates a vRAN after a vDU is scaled-out, according to an embodiment of the disclosure.

FIG. 4 illustrates an operation of scaling-out a vDU, according to an embodiment of the disclosure, and FIG. 5 illustrates a vRAN 502 after a vDU is scaled-out.

A vRAN 402 of FIG. 4 and the vRAN 502 of FIG. 5 may each correspond to the vRAN 302 of FIG. 3.

Referring to FIG. 4, in a case of scale-out for increasing the number of DUs included in the vRAN 402, new DU N+1 432 is added to the vRAN 402 and then at least some RUs 442 among RUs 441 connected to an existing DU N 431 may be migrated to added DU N+1 432.

An operation of scaling-out a DU may be performed by an apparatus such as a schedule coordinator for scheduling an air resource of a vDU. The apparatus selects a RU (e.g., RU m 442) to be migrated to a target DU (e.g., DU N+1 432) from among one or more RUs (e.g., RU 1 to RU m) connected to a source DU (e.g., DU N 431). Afterward, the apparatus requests the source DU (e.g., DU N 431) to exclusively transmit or receive first information including synchronization information of a UE connected to the selected RU (e.g., RU m 442). For example, the apparatus may request a source vDU (e.g., DU N 431) to exclusively transmit or receive first information including synchronization information of UEs connected to a specific RU (e.g., RU m 442) that is a target to be migrated.

Afterward, the apparatus may configure a dedicated air resource for the source DU (e.g., DU N 431) and may configure a dedicated air resource for the target DU (e.g., DU N+1 432). In an embodiment of the disclosure, migration of the RU (e.g., RU m 442) may be performed via a handover of at least one UE connected to the RU (e.g., RU m 442). For example, that the specific RU (e.g., RU m 442) is migrated from the source vDU (e.g., DU N 431) to a target vDU (e.g., DU N+1 432) may indicate that UEs connected to the specific RU (e.g., RU m 442) are each connected to the source vDU (e.g., DU N 431) and then are handed over to the target vDU (e.g., DU N+1 432). That is, at a particular time point during migration of the specific RU (e.g., RU m 442), some of a plurality of UEs connected to the specific RU (e.g., RU m 442) corresponding thereto are completed with respect to their handover to the target vDU (e.g., DU N+1 432), and others are not handed over yet and thus their connection to the source vDU (e.g., DU N 431) is maintained. In this case, the UEs of which handover to the target vDU (e.g., DU N+1 432) is completed may transmit or receive data to or from the target vDU (e.g., DU N+1 432) by using an air resource dedicated to the target vDU (e.g., DU N+1 432), and the UEs of which connection to the source vDU (e.g., DU N 431) is maintained as the UEs are not handed over yet may transmit or receive data to or from the source vDU (e.g., DU N 431) by using an air resource dedicated to the source vDU (e.g., DU N 431).

Unlike an embodiment of the disclosure, when all UEs being serviced via RU m 442 in the drawing are simultaneously migrated from DU N 431 to DU N+1 432 for service, a MAC scheduler of DU N 431 and DU N+1 432 may operate as below. First, while a migration operation of RU m 442 is performed, the MAC scheduler of DU N 431 may suspend air resource allocation to all UEs connected to RU m 442, and after RU m 442 is completely migrated to DU N+1 432, the MAC scheduler of DU N+1 432 may re-allocate an air resource to all UEs. When all UEs connected to RU m 442 are simultaneously handed over, a migration operation cannot be performed in consideration of a QoS requested by each UE, and when an operation of migrating context of a plurality of UEs to DU N+1 432 takes a long time, a radio link failure (RLF) may simultaneously occur to the plurality of UEs. When the plurality of UEs perform a random access (RA) procedure as the RLF occurs to the plurality of UEs, an entire QoS of a network may deteriorate. Therefore, a handover is not simultaneously performed on all UEs connected to RU m 442 that is a migration target, but the handover is sequentially performed on the plurality of UEs, or the plurality of UEs are grouped and then the handover is performed on the groups of the plurality of UEs.

In order to hand over UEs connected to RU m 442 that is a migration target in one-by-one manner or in a unit of a small group, all UEs connected to RU m 442 have to be simultaneously connected to the source DU (e.g., DU N 431) and the target DU (e.g., DU N+1 432) until all UEs are handed over to the target DU (e.g., DU N+1 432). Also, in this case, as single RU m 442 uses a single air resource, a MAC scheduler included in each DU has to divide the single air resource and allocate the resource not to be overlapped between the source DU (e.g., DU N 431) and the target DU (e.g., DU N+1 432). According to an embodiment of the disclosure, a method of scheduling an air resource between the source DU (e.g., DU N 431) and the target DU (e.g., DU N+1 432) before a handover with respect to all UEs is completed in a vDU scaling procedure may be provided.

Referring to FIG. 5, the vRAN 502 after a scale-out operation of increasing the number of DUs included in the vRAN 502 may further include a DU (e.g., DU N+1 536) that is added, compared to the vRAN 302 of FIG. 3. k RUs 545 among m RUs connected to DU N 535 before the scale-out operation may remain with respect to their connection to DU N 535 after the scale-out operation, and m-k RUs 546 among the m RUs may be connected to newly-added DU N+1 536 after the scale-out operation. (where each of m and k is a natural number satisfying k<m)

Referring back to FIG. 4, while migration of the migration-target RU (e.g., RU m 442) is performed, the source vDU (e.g., DU N 431) and the target vDU (e.g., DU N+1 432) may be connected to each other via an inter-DU interface. For example, the inter-DU interface may be an Xd interface.

Figure 6:
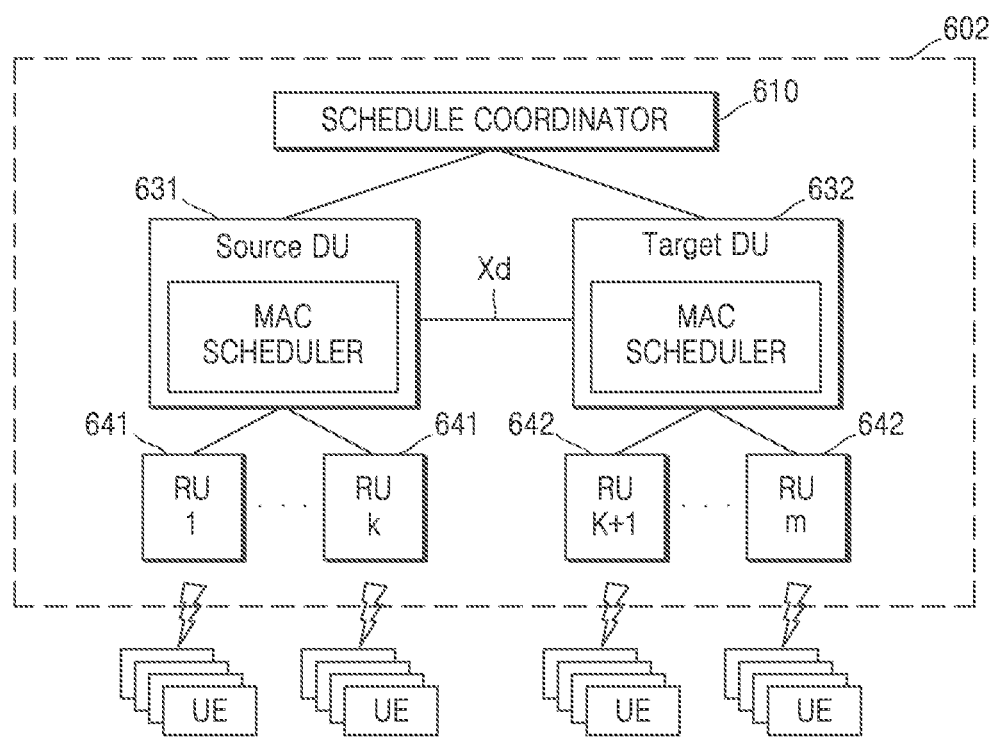
FIG. 6 illustrates an operation of scaling-out a vDU, according to an embodiment of the disclosure.

FIG. 6 illustrates an operation of scaling-out a vDU, according to an embodiment of the disclosure.

A vRAN 602 of FIG. 6 may correspond to the vRAN 302 of FIG. 3, the vRAN 402 of FIG. 4, and the vRAN 502 of FIG. 5.

Referring to FIG. 6, in a scale-out operation, after a target DU 632 is added to the vRAN 602, at least some RUs 642 among RUs 641 connected to a source DU 631 may be migrated to the target DU 632. The scale-out operation may be performed by a schedule coordinator 610. The schedule coordinator 610 selects RUs (e.g., RU k+1 to RU m 642) to be migrated to the target DU 632 among one or more RUs (e.g., RU 1 to RU m) connected to the source DU 631. Afterward, the schedule coordinator 610 requests the source DU 631 to exclusively transmit or receive first information including synchronization information of UEs connected to the selected RUs (e.g., RU k+1 to RU m 642). For example, the schedule coordinator 610 may request the source DU 631 to exclusively transmit or receive the first information including synchronization information of the UEs connected to the selected RUs (e.g., RU k+1 to RU m 642) to be migrated.

Afterward, the schedule coordinator 610 may configure a dedicated air resource for the source DU 631 and may configure a dedicated air resource for the target DU 632. In an embodiment of the disclosure, migration of the RUs (e.g., RU k+1 to RU m 642) may be performed via a handover of at least one UE connected to the RUs (e.g., RU k+1 to RU m 642).

Referring to FIG. 6, k RUs 641 among m RUs connected to the source DU 631 before the scale-out operation may remain with respect to their connection to the source DU 631 after the scale-out operation, and m-k RUs 642 among the m RUs may be connected to the newly-added target DU 632 after the scale-out operation. (where each of m and k is a natural number satisfying k<m)

While migration of the RUs (e.g., RU k+1 to RU m 642) is performed, the source DU 631 and the target DU 632 may be connected to each other via an inter-DU interface. For example, the inter-DU interface may be an Xd interface.

During scale-in or scale-out and operations, the source DU 631 and the target DU 632 share a common RU and thus share a common air resource. In an embodiment of the disclosure, when a resource map as to which air resource is used is shared between vDUs for every slot, scheduling may be performed not to overlap an air resource. However, this scheme causes signaling overhead for every slot, and furthermore, when it is agreed that a source DU first completes scheduling and then transfers a resource map to a target DU, the target DU cannot perform any scheduling work until the target DU receives the resource map, such that concurrency deteriorates.

Accordingly, in an embodiment of the disclosure, in order to minimize data exchange between a plurality of vDUs, a dedicated air resource that is separated in a frequency band or a time band is allocated.

Figure 7:
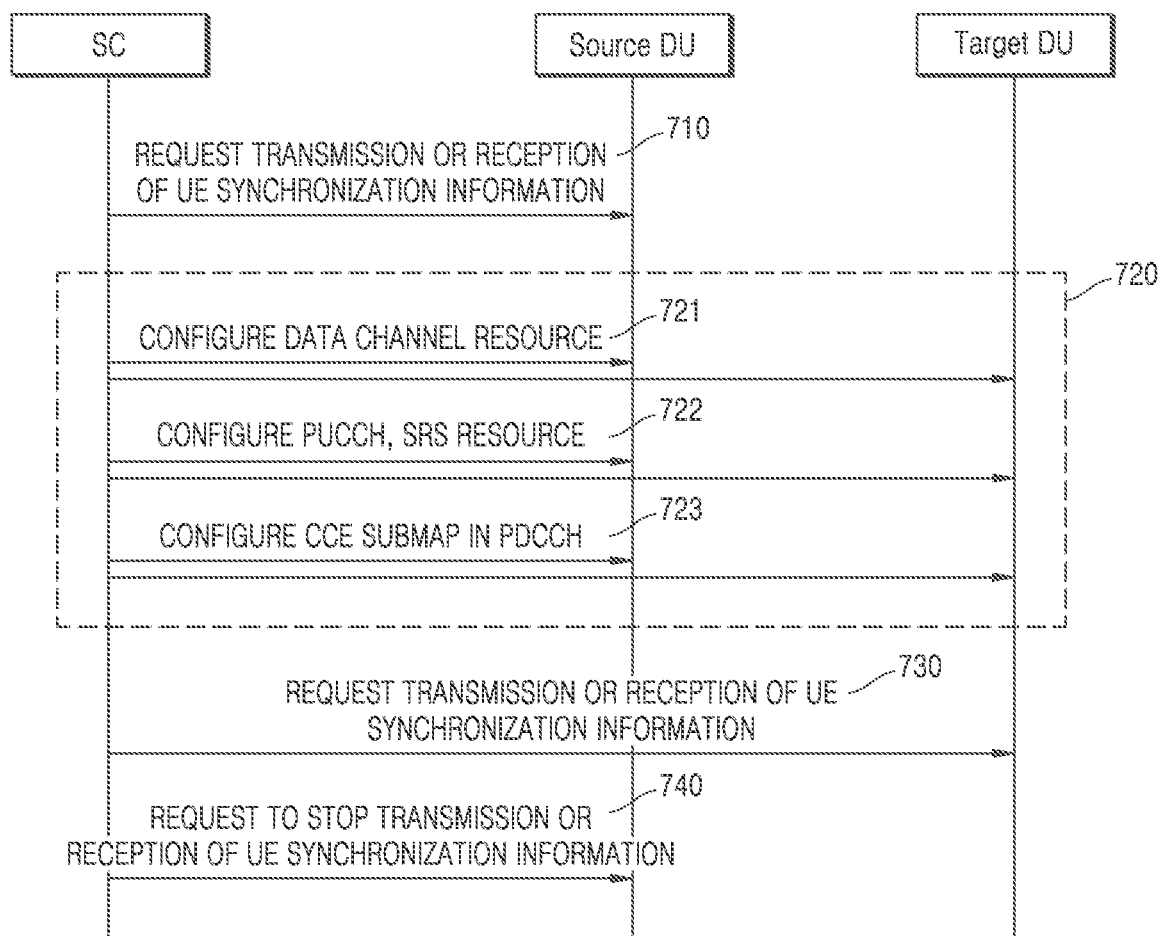
FIG. 7 illustrates a method of scheduling an air resource of a vDU in a vDU scale-out operation, according to an embodiment of the disclosure.

FIG. 7 illustrates a method of scheduling an air resource of a vDU in a vDU scale-out operation, according to an embodiment of the disclosure.

In operation 710, an apparatus such as a schedule coordinator SC that schedules an air resource of a vDU may request a source DU to exclusively transmit or receive first information including synchronization information of a UE connected to a selected RU. Operation 710 of FIG. 7 may correspond to operation 220 of FIG. 2 described above.

In operation 720, the apparatus such as the schedule coordinator SC that schedules an air resource of a vDU may configure a dedicated air resource for the source DU and may configure a dedicated air resource for a target DU. For example, the apparatus may allocate a source vDU-dedicated air resource to the source vDU, and may allocate a target vDU-dedicated air resource to the target vDU. Operation 720 of FIG. 7 may correspond to operation 230 of FIG. 2 described above.

In a DL scenario according to an embodiment of the disclosure, operation (operation 720) of allocating the source vDU-dedicated air resource to the source vDU and allocating the target vDU-dedicated air resource to the target vDU may include operation of (operation 721) allocating a data channel resource for transmitting PDSCH information to each of the source vDU and the target vDU, and operation (operation 723) of allocating an air resource for transmitting UE-specific PDCCH information to each of the source vDU and the target vDU.

In a UL scenario according to an embodiment of the disclosure, operation (operation 720) of allocating the source vDU-dedicated air resource to the source vDU and allocating the target vDU-dedicated air resource to the target vDU may include operation (operation 721) of allocating a data channel resource for transmitting PUSCH information to each of the source vDU and the target vDU, and operation (operation 722) of allocating an air resource for transmitting PUCCH information or SRS information to each of the source vDU and the target vDU.

In operation 730 and operation 740, after migration of the selected RU is completed, the apparatus such as the schedule coordinator SC that schedules an air resource of a vDU may request the target DU to exclusively transmit or receive the first information, and may request the source DU to stop transmitting or receiving the first information. For example, when migration of the specific RU that is a migration target to the target vDU is completed, the apparatus may request the target vDU to exclusively transmit or receive the first information and may request the source vDU to stop transmitting or receiving the first information. Operation 730 and operation 740 of FIG. 7 may correspond to operation 240 of FIG. 2 described above.

Figure 8:
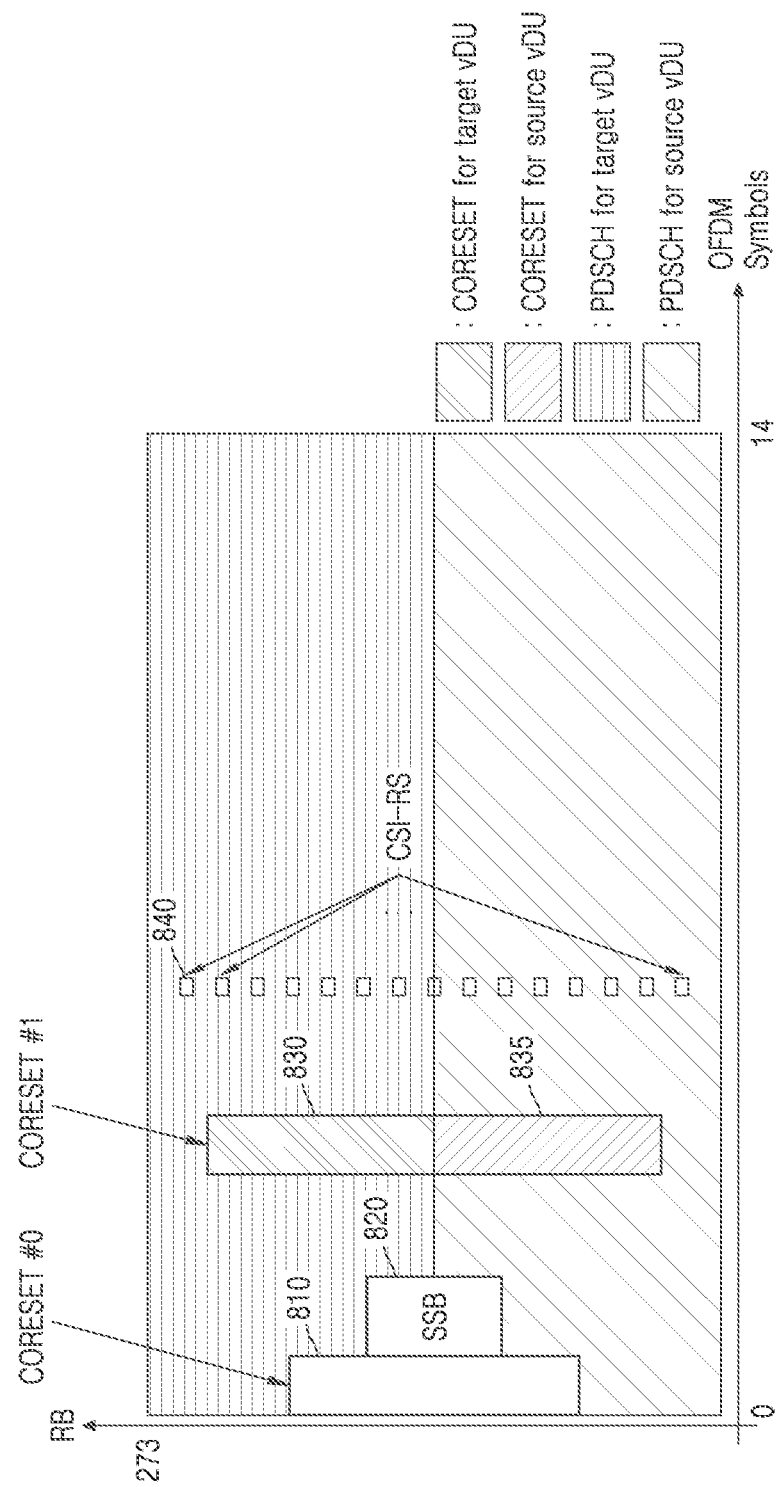
FIG. 8 illustrates a resource block (RB) map in a downlink (DL), according to an embodiment of the disclosure.
Figure 9:
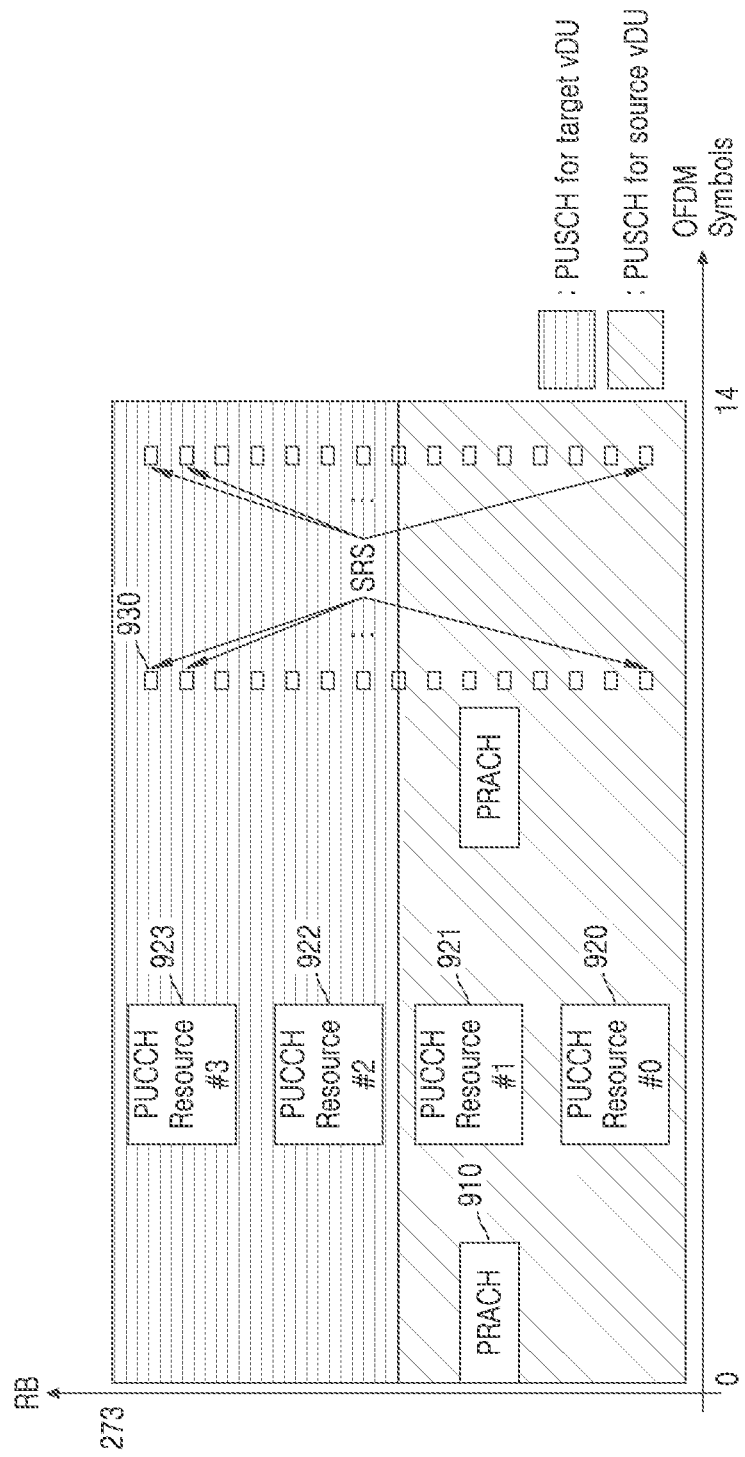
FIG. 9 illustrates an RB map in an uplink (UL), according to an embodiment of the disclosure.

FIG. 8 illustrates an RB map in a DL, according to an embodiment of the disclosure, and FIG. 9 illustrates an RB map in a UL, according to an embodiment of the disclosure.

Referring to FIGS. 8 and 9, a first air resource for a source vDU to transmit or receive first information including synchronization information of one or more UEs connected to a migration-target RU may be preferentially allocated from among all air resources. The first information includes information that is common to the UEs or is necessary for connectivity of the UEs.

In an embodiment of the disclosure, the first information may include at least one of SSB information, common PDCCH information, CSI-RS information, or DL common data information.

For example, referring to FIG. 8, the first information in a DL scenario may include common PDCCH information being transmitted on CORESET #0 resource 810, CSI-RS information being transmitted on a CSI-RS resource 840, and SSB information being transmitted on an SSB resource 820. Referring to FIG. 9, the first information in a UL scenario may include UE synchronization information being transmitted on a PRACH resource 910. The y-axis indicates an RB index and the x-axis indicates OFDM symbols in one slot.

Afterward, a resource region excluding the first air resource configured for transmission of the first information in an entire resource pool may be segmented into a source vDU-dedicated air resource or a target vDU-dedicated air resource.

Referring to Table 1 above, other channel or signals which are not exclusively transmitted or received by the source vDU during RU migration may correspond to second information. A vDU to transmit or receive data of the second information may vary depending on whether a UE corresponding thereto is connected to a source vDU or a target vDU. That is, the second information may be transmitted or received on the source vDU-dedicated air resource or the target vDU-dedicated air resource according to a relation of a UE corresponding thereto.

In an embodiment of the disclosure, second information transmitted on the source vDU-dedicated air resource or the target vDU-dedicated air resource may include at least one of PDSCH information, PUSCH information, PUCCH information, SRS information, or UE-specific PDCCH information.

For example, referring to FIG. 8, the second information in a DL scenario may include UE-specific PDCCH information being transmitted on CORESET #1 resources 830 or CORESET #1 resources 835, and PDSCH information or data being transmitted on a resource excluding, from an entire resource pool, first air resources 810, 820, and 840 and CORESET #1 resources 830 and 835 whose usage is determined. Referring to FIG. 9, the second information in a UL scenario may include PUCCH information being transmitted on PUCCH resources 920, 921, 922, or 923, SRS information being transmitted on an SRS resource 930, and PUSCH information or data being transmitted on a resource excluding, from an entire resource pool, the first air resource 910 (e.g., PRACH resource 910), the PUCCH resources 920, 921, 922, and 923 whose usage is determined, and the SRS resource 930.

Figure 10:
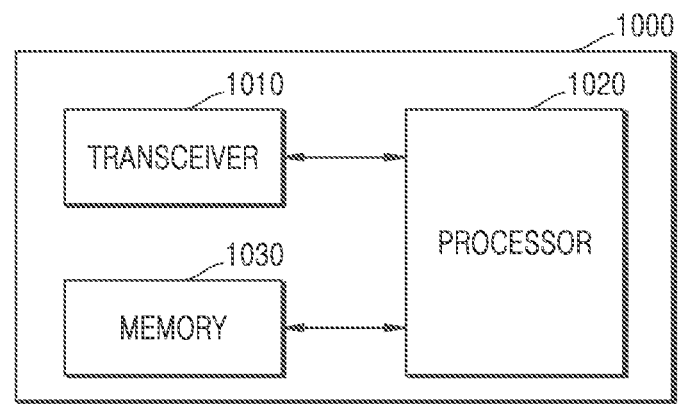
FIG. 10 illustrates a block diagram of a configuration of an apparatus for scheduling an air resource of a vDU, according to an embodiment of the disclosure.

FIG. 10 illustrates a block diagram of a configuration of an apparatus 1000 for scheduling an air resource of a vDU, according to an embodiment of the disclosure. In an embodiment of the disclosure, the apparatus 1000 may be a schedule coordinator shown in FIG. 3, 5, or 6.

Referring to FIG. 10, the apparatus 1000 may include a transceiver 1010, a processor 1020, and a memory 1030. The transceiver 1010, the processor 1020, and the memory 1030 of the apparatus 1000 may operate according to the aforementioned communication schemes of the apparatus 1000. However, elements of the apparatus 1000 are not limited to the example above. For example, the apparatus 1000 may include more elements than the aforementioned elements or may include fewer elements than the aforementioned elements. In an embodiment of the disclosure, the transceiver 1010, the processor 1020, and the memory 1030 may be implemented as one chip. Also, the processor 1020 may include one or more processors.

A transmitter and a receiver of the apparatus 1000 may be collectively referred to as the transceiver 1010, and the transceiver 1010 may transmit or receive a signal to or from a UE or a network entity. The signal transmitted to or received from the UE or the network entity may include control information and data. To this end, the transceiver 1010 may include a RF transmitter for up-converting a frequency of and amplifying signals to be transmitted, and an RF receiver for low-noise-amplifying and down-converting a frequency of received signals. However, this is merely an example of the transceiver 1010, and thus elements of the transceiver 1010 are not limited to the RF transmitter and the RF receiver.

Also, the transceiver 1010 may perform functions for transmitting or receiving a signal via a wireless channel. For example, the transceiver 1010 may receive a signal via a wireless channel and output the signal to the processor 1020, and may transmit a signal output from the processor 1020, via a wireless channel.

The memory 1030 may store programs and data necessary for operations of the apparatus 1000. Also, the memory 1030 may store control information or data which are included in a signal obtained by the apparatus 1000. The memory 1030 may be implemented as a storage medium including a read only memory (ROM), a random access memory (RAM), a hard disk, a compact disc (CD)-ROM, a digital versatile disc (DVD), or the like, or any combination thereof. Alternatively, the memory 1030 may not be separately arranged but may be included in the processor 1020. The memory 1030 may be configured as a volatile memory, a non-volatile memory, or a combination of a volatile memory and a non-volatile memory. The memory 1030 may provide stored data, in response to a request by the processor 1020.

The processor 1020 may control a series of processes to allow the apparatus 1000 to operate according to the aforementioned embodiments of the disclosure. For example, the processor 1020 may receive a control signal and a data signal by using the transceiver 1010, and may process the received control signal and the received data signal. The processor 1020 may transmit the processed control signal and the processed data signal by using the transceiver 1010. Also, the processor 1020 may record data to and read data from the memory 1030. The processor 1020 may perform functions of a protocol stack which are requested by the communication rules. To do so, the processor 1020 may include at least one processor or a micro-processor. In an embodiment of the disclosure, a part of the transceiver 1010 or the processor 1020 may be referred to as a communication processor (CP).

The processor 1020 may refer to one or more processors. In this case, the one or more processors may each be a general-purpose processor such as a central processing unit (CPU), an application processor (AP), a digital signal processor (DSP), or the like, a graphics-dedicated processor such as a graphics processing unit (GPU), a vision processing unit (VPU) or the like, or an AI-dedicated processor such as a neural processing unit (NPU). For example, each of the one or more processors is the AI-dedicated processor, the AI-dedicated processor may be designed to have a hardware structure specialized for processing of a particular AI model.

In an embodiment of the disclosure, the apparatus 1000 may identify an RU to be migrated to a target vDU among one or more RUs connected to a source vDU, may request, via a transceiver, the source vDU to exclusively transmit or receive first information including synchronization information of at least one UE connected to the RU, may allocate a source vDU-dedicated air resource to the source vDU, may allocate a target vDU-dedicated air resource to the target vDU, may request, via the transceiver, the target vDU to exclusively transmit or receive the first information when migration of the RU is completed, and may request the source vDU to stop transmitting or receiving the first information.

Figure 11:
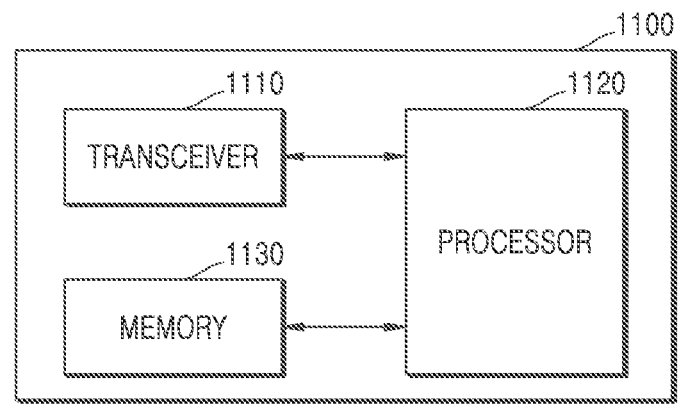
FIG. 11 illustrates a block diagram of a configuration of a network entity according to an embodiment of the disclosure.

FIG. 11 illustrates a block diagram of a configuration of a network entity 1100 according to an embodiment of the disclosure. The network entity 1100 may be a server, a CU, a vCU, a DU, a vDU, a RU, a core network, or a UE, according to an embodiment of the disclosure.

Referring to FIG. 11, the network entity 1100 according to an embodiment of the disclosure may include a processor 1120, a memory 1130, and a transceiver 1110. However, elements of the network entity 1100 are not limited to the example above. For example, the network entity 1100 may include more elements than the aforementioned elements or may include fewer elements than the aforementioned elements. In an embodiment of the disclosure, the processor 1120, the memory 1130, and the transceiver 1110 may be implemented as one chip.

The processor 1120 may include one or more processors. In this case, the one or more processors may each be a general-purpose processor such as a CPU, an AP, a DSP, or the like, a graphics-dedicated processor such as a GPU, a VPU or the like, or an AI-dedicated processor such as a NPU. For example, each of the one or more processors is the AI-dedicated processor, the AI-dedicated processor may be designed to have a hardware structure specialized for processing of a particular AI model.

The processor 1120 may control a series of processes to allow the network entity 1100 to operate according to the aforementioned embodiments of the disclosure. For example, the processor 1120 may receive a control signal and a data signal by using the transceiver 1110, and may process the received control signal and the received data signal. The processor 1120 may transmit the processed control signal and the processed data signal by using the transceiver 1110. Also, the processor 1120 may control input data to be controlled based on a predefined operation rule or an AI model which are stored in the memory 1130, the input data being derived from the received control signal and the received data signal. The processor 1120 may record data to and read data from the memory 1130. The processor 1120 may perform functions of a protocol stack which are requested by the communication rules. According to an embodiment of the disclosure, the processor 1120 may include at least one processor. In an embodiment of the disclosure, a part of the transceiver 1110 or the processor 1120 may be referred to as a CP.

The memory 1130 may store programs and data necessary for operations of the network entity 1100. Also, the memory 1130 may store control information or data which are included in a signal obtained by the network entity 1100. Also, the memory 1130 may store the predefined operation rule or the AI model which are used by the network entity 1100. The memory 1130 may be implemented as a storage medium including a ROM, a RAM, a hard disk, a CD-ROM, a DVD, or the like, or any combination thereof. Alternatively, the memory 1130 may not be separately arranged but may be included in the processor 1120. The memory 1130 may be configured as a volatile memory, a non-volatile memory, or a combination of a volatile memory and a non-volatile memory. The memory 1130 may provide stored data, in response to a request by the processor 1120.

A transmitter and a receiver of the network entity 1100 may be collectively referred to as the transceiver 1110, and the transceiver 1110 of the network entity 1100 may transmit or receive a signal to or from an apparatus or a network entity. The signal transmitted to or received may include control information and data. To this end, the transceiver 1110 may include a RF transmitter for up-converting a frequency of and amplifying signals to be transmitted, and an RF receiver for low-noise-amplifying and down-converting a frequency of received signals. However, this is merely an example of the transceiver 1110, and thus elements of the transceiver 1110 are not limited to the RF transmitter and the RF receiver. For example, the transceiver 1110 may receive a signal via a wireless channel and output the signal to the processor 1120, and may transmit a signal output from the processor 1120, via a wireless channel.

Various embodiments of the disclosure may be implemented or supported by one or more computer programs, and the computer programs may be formed of computer-readable program codes and may be embodied on a computer-readable medium. In the disclosure, the terms "application" and "program" may refer to one or more computer programs, software components, instruction sets, procedures, functions, objects, classes, instances, associated data, or part thereof, which are appropriately implemented in computer-readable program codes. The "computer-readable program codes" may include various types of computer codes including source codes, target codes and executable codes. The "computer-readable medium" may include various types of medium accessible by a computer, such as a ROM, RAM, a hard disk drive (HDD), a compact disc (CD), a DVD or other various types of memory.

Also, the computer-readable storage medium may be provided in the form of a non-transitory storage medium. Here, the term 'non-transitory storage medium' means that the storage medium is a tangible entity and may exclude wired, wireless, optical, or other communication links via which temporary electrical or other signals are transmitted. The 'non-transitory storage medium' does not distinguish that data is stored semi-permanently or temporarily on the storage medium. For example, the non-transitory storage medium may include a buffer in which data is temporarily stored. The computer-readable medium may include any usable medium that may be accessed by computers, volatile and non-volatile mediums, and detachable and non-detachable mediums. The computer-readable medium includes a medium for permanently storing data, and a medium for storing data which can be overwritten afterward, i.e., a rewritable optical disk or an erasable memory device.

According to an embodiment of the disclosure, a method according to various embodiments of the disclosure may be provided in a computer program product. The computer program product may be traded between a seller and a purchaser as a commodity. The computer program product may be distributed in the form of a machine-readable storage medium (e.g., CD-ROM), or may be distributed online (e.g., downloaded or uploaded) through an application store or directly between two user devices (e.g., smart phones). For online distribution, at least a part of the computer program product (e.g., a downloadable app.) may be temporarily generated or be at least temporarily stored in a machine-readable storage medium such as a manufacturer's server, an application store's server, or a memory of a relay server.

While the disclosure has been particularly shown and described with reference to the accompanying drawings, in which embodiments of the disclosure are shown, it is obvious to one of ordinary skill in the art that the disclosure may be easily embodied in many different forms without changing the technical concept or essential features of the disclosure. For example, the aforementioned method may be performed in a different order, and/or the aforementioned systems, structures, devices, circuits, etc., may be combined in different combinations from what is described above, or replaced or substituted by other components or equivalents thereof, in order to obtain appropriate results. Thus, it should be understood that the embodiments described herein should be considered in a descriptive sense only and not for purposes of limitation. For example, configuring elements that are singular forms may be executed in a distributed fashion, and also, configuring elements that are distributed may be combined and then executed.

The scope of the disclosure is defined by the appended claims, rather than defined by the aforementioned detailed descriptions, and all differences and modifications that can be derived from the meanings and scope of the claims and other equivalent embodiments therefrom will be construed as being included in the disclosure.

The invention claimed is:

1. A method, performed by a schedule coordinator in a wireless communication system, the method comprising:
   identifying a radio unit (RU) to be migrated to a target virtual distributed unit (target vDU), from among one or more RUs connected to a source vDU;
   requesting the source vDU to exclusively transmit or receive first information comprising synchronization information of one or more user equipments (UEs) connected to the RU;
   allocating a source vDU-dedicated air resource to the source vDU, and allocating a target vDU-dedicated air resource to the target vDU; and
   when migration of the RU is completed, requesting the target vDU to exclusively transmit or receive the first information, and requesting the source vDU to stop transmitting or receiving the first information.

2. The method of claim 1, wherein the first information comprises at least one of synchronization signal block (SSB) information, common physical downlink control channel (PDCCH) information, channel state information reference signal (CSI-RS) information, or downlink (DL) common data information.

3. The method of claim 1, wherein second information transmitted on the source vDU-dedicated air resource or the target vDU-dedicated air resource comprises at least one of physical downlink shared channel (PDSCH) information, physical uplink shared channel (PUSCH) information, physical uplink control channel (PUCCH) information, sounding reference signal (SRS) information, or UE-specific physical downlink control channel (PDCCH) information.

4. The method of claim 1, wherein the migration of the RU is completed when the one or more UEs connected to the RU are all handed over from the source vDU to the target vDU.

5. The method of claim 4, further comprising:
   receiving a migration complete response message with respect to the RU; and
   determining, based on the migration complete response message, that the RU is completely migrated from the source vDU to the target vDU.

6. The method of claim 1, wherein
   the requesting of the source vDU to exclusively transmit or receive the first information comprises allocating, to the source vDU, a first air resource for transmitting or receiving the first information, and
   the allocating of the source vDU-dedicated air resource to the source vDU and the allocating of the target vDU-dedicated air resource to the target vDU comprise segmenting a plurality of resources, except for the first air resource, in an entire resource pool into the source vDU-dedicated air resource or the target vDU-dedicated air resource.

7. The method of claim 6, wherein the segmenting of the plurality of resources, except for the first air resource, in the entire resource pool into the source vDU-dedicated air resource or the target vDU-dedicated air resource is based on at least one of a first number of UEs connected to the source vDU, a second number of UEs connected to the target vDU, a first amount of traffic corresponding to the source vDU, or a second amount of traffic corresponding to the target vDU.

8. The method of claim 6, wherein a first region corresponding to the source vDU-dedicated air resource and a second region corresponding to the target vDU-dedicated air resource are separated in at least one of a time band or a frequency band on a resource block (RB) map corresponding to the entire resource pool.

9. The method of claim 1, wherein the allocating of the source vDU-dedicated air resource to the source vDU and the allocating of the target vDU-dedicated air resource to the target vDU comprise:
   allocating, to each of the source vDU and the target vDU, a data channel resource for transmitting PDSCH information; and
   allocating, to each of the source vDU and the target vDU, an air resource for transmitting UE-specific PDCCH information.

10. The method of claim 1, wherein the allocating of the source vDU-dedicated air resource to the source vDU and the allocating of the target vDU-dedicated air resource to the target vDU comprise:
    allocating, to each of the source vDU and the target vDU, a data channel resource for transmitting PUSCH information; and
    allocating, to each of the source vDU and the target vDU, an air resource for transmitting PUCCH information or SRS information.

11. An apparatus for scheduling an air resource of a virtual distributed unit (vDU) in a wireless communication system, the apparatus comprising:
    a transceiver; and
    at least one processor,
    wherein the at least one processor is configured to:
       identify a radio unit (RU) to be migrated to a target vDU, from among one or more RUs connected to a source vDU,
       request, via the transceiver, the source vDU to exclusively transmit or receive first information comprising synchronization information of one or more user equipments (UEs) connected to the RU,
       allocate a source vDU-dedicated air resource to the source vDU, and allocate a target vDU-dedicated air resource to the target vDU, and
       when migration of the RU is completed, request, via the transceiver, the target vDU to exclusively transmit or receive the first information, and request, via the transceiver, the source vDU to stop transmitting or receiving the first information.

12. The apparatus of claim 11, wherein the migration of the RU is completed when the one or more UEs connected to the RU are all handed over from the source vDU to the target vDU.

13. The apparatus of claim 12, wherein the at least one processor is further configured to
    receive, via the transceiver, a migration complete response message with respect to the RU, and
    determine, based on the migration complete response message, that the RU is completely migrated from the source vDU to the target vDU.

14. The apparatus of claim 11, wherein the at least one processor is further configured to
    allocate, to the source vDU, a first air resource for transmitting or receiving the first information, and
    segment a plurality of resources, except for the first air resource, in an entire resource pool into the source vDU-dedicated air resource or the target vDU-dedicated air resource.

15. A virtual radio access network (vRAN) connected to a core network in a wireless communication system, the vRAN comprising:
    a virtual centralized unit (vCU);
    at least one virtual distributed unit (vDU) connected to the vCU;

at least one radio unit (RU) connected to the at least one vDU; and a schedule coordinator configured to schedule an air resource of the at least one vDU, wherein the schedule coordinator is further configured to:
- identify a radio unit (RU) to be migrated to a target vDU, from among one or more RUs connected to a source vDU,
- request the source vDU to exclusively transmit or receive first information comprising synchronization information of one or more user equipments (UEs) connected to the RU,
- allocate a source vDU-dedicated air resource to the source vDU, and allocate a target vDU-dedicated air resource to the target vDU, and
- when migration of the RU is completed, request the target vDU to exclusively transmit or receive the first information, and request the source vDU to stop transmitting or receiving the first information.

* * * * *